(12) United States Patent
Himmel et al.

(10) Patent No.: US 9,935,505 B2
(45) Date of Patent: Apr. 3, 2018

(54) LAMINATED CORE

(71) Applicant: Robert Bosch GmbH, Stuttgart (DE)

(72) Inventors: Oliver Himmel, Buehl (DE); Ursula Stucke, Sinzheim (DE); Joost Nowak, Metzingen (DE); Ingo Buchholz, Buehl (DE); Alexis Spinner, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 14/369,962

(22) PCT Filed: Dec. 27, 2012

(86) PCT No.: PCT/EP2012/076936
§ 371 (c)(1),
(2) Date: Jun. 30, 2014

(87) PCT Pub. No.: WO2013/098315
PCT Pub. Date: Jul. 4, 2013

(65) Prior Publication Data
US 2014/0339929 A1 Nov. 20, 2014

(30) Foreign Application Priority Data
Dec. 29, 2011 (DE) .................. 10 2011 090 081

(51) Int. Cl.
*H02K 1/00* (2006.01)
*H02K 1/04* (2006.01)
(Continued)

(52) U.S. Cl.
CPC ......... *H02K 1/04* (2013.01); *B29C 45/14639* (2013.01); *H02K 1/16* (2013.01);
(Continued)

(58) Field of Classification Search
CPC .. H02K 1/04; H02K 1/16; H02K 1/26; H02K 3/345; H02K 15/026; H02K 15/105
(Continued)

(56) References Cited

U.S. PATENT DOCUMENTS 2,457,740 A * 12/1948 Sigmund .................. H02K 3/44
310/215
3,943,392 A * 3/1976 Keuper .................. H02K 3/345
174/DIG. 19
(Continued)

FOREIGN PATENT DOCUMENTS

| CA | 1064250 | 10/1979 |
|----|---------|---------|
| GB | 633126  | 12/1949 |

(Continued)

OTHER PUBLICATIONS

International Search Report for Application No. PCT/EP2012/076936 dated Apr. 11, 2013 (English Translation, 3 pages).

*Primary Examiner* — Joshua Benitez Rosario
*Assistant Examiner* — Leda Pham
(74) *Attorney, Agent, or Firm* — Michael Best & Friedrich LLP

(57) ABSTRACT

The invention relates to a laminated core, preferably a stator laminated core or a rotor laminated core (2), of an electric machine, in particular an electric fuel pump of a motor vehicle. The laminated core comprises slots (6), each of which has a slot insulation (7), and winding wires of at least one electric winding (10), said wires running in the slots (6). A plastic encapsulation (17) encases the laminated core together with the winding wires which run in the slots (6) at least in some regions. The plastic encapsulation (17) and the slot insulation (7) each consist of a thermoplastic, and the plastic of the slot insulation (7) has a melting point which is equal to, similar to, or lower than the melting point of the plastic of the plastic encapsulation (17) such that the encap- (Continued)

sulation process causes the slot insulation (7) to melt, thereby bonding the slot insulation (7) to the plastic encapsulation (17). The invention further relates to a method for producing a laminated core and to an electric machine.

17 Claims, 2 Drawing Sheets

(51) Int. Cl.
    *H02K 3/44* (2006.01)
    *H02K 15/12* (2006.01)
    *B29C 45/14* (2006.01)
    *H02K 1/16* (2006.01)
    *H02K 1/26* (2006.01)
    *H02K 3/34* (2006.01)
    *H02K 15/02* (2006.01)
    *H02K 15/10* (2006.01)
    *B29K 59/00* (2006.01)
    *B29L 31/34* (2006.01)

(52) U.S. Cl.
    CPC ............ *H02K 1/26* (2013.01); *H02K 3/345* (2013.01); *H02K 3/44* (2013.01); *H02K 15/026* (2013.01); *H02K 15/105* (2013.01); *H02K 15/12* (2013.01); *B29K 2059/00* (2013.01); *B29L 2031/3481* (2013.01)

(58) Field of Classification Search
    USPC ........................................................ 310/43
    See application file for complete search history.

(56) References Cited

U.S. PATENT DOCUMENTS

| | | | |
|---|---|---|---|
| 6,673,463 B1* | 1/2004 | Onishi | C08J 11/14 209/3 |
| 8,203,239 B2* | 6/2012 | Du | H01R 43/10 310/43 |
| 2009/0260220 A1* | 10/2009 | Moroto | F02M 37/08 29/597 |
| 2011/0018370 A1* | 1/2011 | Du | H01R 43/10 310/43 |
| 2011/0095642 A1* | 4/2011 | Enomoto | H01F 3/04 310/216.045 |

FOREIGN PATENT DOCUMENTS

| | | |
|---|---|---|
| GB | 2290914 | 1/1996 |
| JP | 3070441 | 3/1991 |
| WO | 2008034773 | 3/2008 |

\* cited by examiner

LAMINATED CORE

BACKGROUND OF THE INVENTION

The invention relates to a laminated core, preferably a laminated stator core or laminated rotor core, of an electrical machine, in particular of an electric fuel pump of a motor vehicle, comprising slots which each have a slot insulation and comprising winding wires, which run in the slots, of at least one electrical winding, wherein a plastic encapsulation encases the laminated core, together with the winding wires which run in the slots, at least in regions. The invention also relates to a method for producing a laminated core, and also to an electrical machine.

WO 2008/034773 A1 discloses applying a plastic covering to the surface of an armature of an electrical machine using a hot-channel injection-molding method. In this case, parts of the armature, such as the laminated core, the shaft, the slot insulations, the commutator and the windings, are covered by the plastic covering, with the result that the armature with the plastic covering has a cylindrical shape with a structureless casing surface. On account of this cylindrical shape, hydraulic losses of the armature during operation in a liquid are reduced. However, the armature is not securely protected against corrosive constituent parts of the liquid by the previously known plastic coverings, as a result of which the armature may be damaged and therefore reliable operation of said armature is not guaranteed over the long term.

SUMMARY OF THE INVENTION

In the case of a laminated core of the kind described in the introductory part, the invention makes provision for the plastic encapsulation and the slot insulations to each be composed of a thermoplastic, and for the plastic of the slot insulations to have a melting point which is equal to or similar to or lower than that of the plastic of the plastic encapsulation for cohesive connection of slot insulations and the plastic encapsulation by virtue of incipient melting of the slot insulations which takes place during the encapsulation process. During the encapsulation process, that is to say during the application of the plastic encapsulation, the plastic of the slot insulations begins to melt, in particular close to the surface, and therefore the two plastics fuse at least in regions. This creates a cohesive connection between the slot insulations and the plastic encapsulation. By virtue of this connection, which is based on atomic or molecular forces, between the respective slot insulation and the plastic encapsulation, no liquid or only a little liquid and, respectively, no constituent parts of the liquid or only few constituent parts of the liquid can penetrate the boundary surface of said slot insulation and plastic encapsulation. The cohesive connection therefore increases the impermeability of said boundary surface. In this respect, no liquid and, respectively, no constituent parts of the liquid or only a little liquid and, respectively, few constituent parts of the liquid reach/reaches the winding wires of the electrical winding. In particular, ingress of low-molecular-weight substances, for example chemically aggressive or corrosive constituent parts of fuels, such as fuels with a different content of ethanol, water and/or salts for example, at the boundary surface between the respective slot insulation and the plastic encapsulation is prevented or at least reduced. As a result, damage to, in particular corrosion of, the winding wires of the electrical winding is avoided or reduced. Consequently, reliable operation of the laminated core and, respectively, of the electrical machine is ensured over the long term, and the service life and the robustness of the laminated core are correspondingly increased.

During the encapsulation process, the temperature of the plastic of the plastic encapsulation is at least as high as its melting temperature, this serving as a critical factor in the melting point in this case. In this respect, the melting point is to be understood to mean, in particular, the melting temperature of the respective plastic. If the plastic of the slot insulations has a melting temperature which is equal to or lower than that of the plastic of the plastic encapsulation, the temperature of the plastic of the plastic encapsulation during the encapsulation process is at least as high as the melting temperature of the slot insulations.

Accordingly, the slot insulations can begin to melt. As an alternative, the plastic of the slot insulations has a melting temperature which is similar to, in particular higher than, that of the plastic of the plastic encapsulation. In order to ensure that the plastic of the slot insulations begins to melt during the encapsulation process, the temperature of the plastic of the plastic encapsulation during the encapsulation process has to be at least as high as the melting temperature of the plastic of the slot insulations. Accordingly, the plastic of the plastic encapsulation has to be heated to a temperature which is above its melting temperature. Since the plastic decomposes into its basic constituent parts when it is excessively heated, provision is made for the plastic of the slot insulations to have a melting temperature which is similar to, in particular only somewhat higher than, that of the plastic of the plastic encapsulation, in order to prevent decomposition in this way and at the same time allow incipient melting.

In one development of the invention, provision is made for the slot insulations and the plastic encapsulation to be composed of the same plastic, in particular at least substantially of polyoxymethylene. Consequently, the plastic of the slot insulations and the plastic of the plastic encapsulation have the same melting temperature. In this respect, the plastic of the slot insulation can begin to melt during the encapsulation process since the temperature of the plastic of the plastic encapsulation, which plastic is used for the encapsulation process, corresponds to the melting temperature of the plastic of the slot insulations, or is greater than said melting temperature of the plastic of the slot insulations. The slot insulations and the plastic encapsulation are preferably composed entirely of polyoxymethylene (POM).

Provision is preferably made for the slot insulations to be injection-molded into the respective slot. The slot insulations are injection-molded into the respective slot before the laminated core is encapsulated with the plastic of the plastic encapsulation. The slot insulations preferably completely cover the inner faces of the respective slot, so that electrical insulation of the winding wires, which run in the slots, is ensured. The slot insulations preferably extend into the end regions of the laminated core in order to also electrically insulate the winding wires there, which, for example, form a winding head in said end regions.

In one development of the invention, provision is made for the surface of the respective slot insulation to have at least one raised portion and/or recessed portion, in particular at least one rib. The raised portion is acted on by the plastic of the plastic encapsulation from several sides at the same time during the encapsulation process. As a result, the raised portion is quickly thermally heated. Accordingly, the raised portion, in particular the surface thereof, also begins to melt more quickly than a flat surface. The raised portion of the surface of the slot insulation is preferably surrounded by the plastic encapsulation and/or the plastic encapsulation enters the recessed portion of the slot insulation. This design is particularly advantageous for a laminated rotor core since the raised portion and/or recessed portion can result in an additional interlocking connection between the respective slot insulation and the plastic encapsulation when the laminated rotor core is rotated about its rotation axis.

Provision is advantageously made for the raised portion, in particular the rib, to be formed with an angular cross section. The width of the raised portion preferably decreases with the height of said raised portion. The raised portion preferably has a sawtooth-shaped cross section. Owing to this design, the encapsulation process with the plastic of the plastic encapsulation may result, in addition to incipient melting of the respective slot insulation, in deformation of the raised portion owing to the exerted pressure of the plastic of the plastic encapsulation, as a result of which the interlocking connection between the slot insulation and the plastic encapsulation can be improved, in particular by engagement from the rear.

Provision is advantageously made for the rib to be in the form of a longitudinal rib or transverse rib. The longitudinal rib is a rib which runs parallel to the rotation axis of the electrical machine, in particular of the laminated rotor core. The longitudinal rib accordingly also extends in the longitudinal direction of the slots. The rib preferably extends over the entire length of the slot. The transverse rib is a rib which runs transversely, in particular orthogonally, to the rotation axis. Several ribs of this kind are preferably provided for each slot insulation. The ribs are preferably formed in the opening region, in particular at the slot edge, of the respective slot.

In one development of the invention, provision is made for the rib to be integrally formed with the respective slot insulation. The rib is accordingly formed at the same time as the slot insulations are injection-molded into the respective slot. As an alternative, said rib can be created by subsequent machining of the respective slot insulation, that is to say machining of the respective slot insulation after the injection-molding process.

Provision is also preferably made for the plastic encapsulation to be formed in such a way that the laminated core has a circular-cylindrical casing outer surface. The casing outer surface is preferably of structureless, in particular smooth, design, as a result of which hydraulic losses, in particular eddy losses, are minimized when the laminated core rotates in a liquid. In a preferred embodiment, the casing outer surface is formed by the plastic encapsulation in some regions and by sheet-metal laminations of the laminated core in some regions, wherein the regions of the plastic encapsulation and the regions of the sheet-metal laminations adjoin one another in a flush manner, so that the circular-cylindrical casing outer surface is formed overall. As an alternative, the casing outer surface can be formed entirely by the plastic encapsulation.

The invention also provides a method for producing a laminated core, preferably a laminated stator core or laminated rotor core, of an electrical machine, in particular of an electric fuel pump of a motor vehicle, wherein the laminated core has slots with in each case one slot insulation and winding wires, which run in the slots, of at least one electrical winding. The laminated core, together with the winding wires which run in the slots, is encapsulated by a plastic encapsulation at least in regions, and the plastic encapsulation and the slot insulations are each composed of a thermoplastic, and the plastic of the slot insulations has a melting point which is equal to or similar to or lower than that of the plastic of the plastic encapsulation, wherein the slot insulations and the plastic encapsulation are cohesively connected to one another by virtue of incipient melting of the slot insulations which takes place during the encapsulation process. The laminated core is advantageously formed in accordance with one or more of the above embodiments. The temperature of the plastic of the plastic encapsulation for the encapsulation process is preferably selected to be high enough that it is higher than the melting temperature of the plastic of the slot insulations. As a result, during the encapsulation process, the slot insulations, in particular the surface of the respective slot insulation, is/are incipiently melted, with the result that a cohesive connection is created between the plastic of the plastic encapsulation and the plastic of the respective slot insulation.

In an advantageous development of the method, provision is made for the laminated core to be heated before the encapsulation process. Therefore, the laminated core, together with the slot insulations and the winding wires which run in the slots, is heated. By virtue of this heating, the temperature of the plastic of the slot insulations is increased in advance in such a way that only a relatively small amount of heat has to be transferred by the plastic of the plastic encapsulation which is used for the encapsulation process to the plastic of the slot insulations in order to allow said plastic of the slot insulations to begin to melt. More rapid incipient melting of the slot insulations can be achieved as a result. In addition, a lower temperature can also be selected for the plastic of the plastic encapsulation, in particular a temperature in the region of its melting temperature. Owing to the laminated core being heated, the temperature of the plastic of the slot insulations is preferably already increased enough, in particular to the region of its melting temperature, that the plastic of the slot insulations has already begun to melt by the heating or only a relatively small amount of heat still needs to be transferred from the plastic of the plastic encapsulation to the plastic of the slot insulations in order to allow said plastic of the slot insulations to begin to melt, as a result of which production of a cohesive connection is ensured.

The invention also relates to an electrical machine comprising a rotor and a stator, wherein the rotor and/or stator have/has a laminated core. According to the invention, the laminated core is formed in accordance with one or more of the above embodiments.

BRIEF DESCRIPTION OF THE DRAWINGS

The following drawings illustrate the invention on the basis of an exemplary embodiment, specifically.

DETAILED DESCRIPTION

Figure 1:
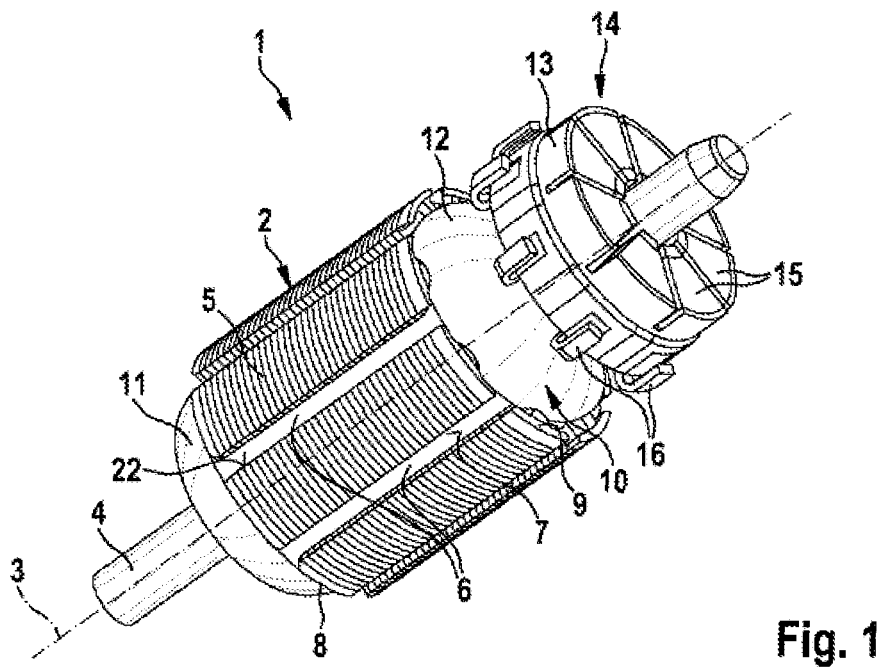
FIG. 1 is a perspective illustration of a rotor.

FIG. 1 shows a perspective illustration of a rotor 1 of an electrical machine (not illustrated). Said rotor is preferably a rotor 1 of an electric fuel pump of a motor vehicle. Accordingly, fuel washes around the rotor 1 during operation.

The rotor 1 has a laminated rotor core 2 which is arranged in a rotationally fixed manner on a shaft 4 which defines a rotation axis 3. The laminated rotor core 2 has a laminated core 5 which comprises sheet-metal laminations. Several axially running slots 6 are formed in the laminated core 5. The slots 6 are each provided with a slot insulation 7 which is provided on the inner faces of the respective slot 6 and completely covers said inner faces. The slot insulations 7 are preferably injection-molded into the slots 6. The slot insulations 7 additionally preferably extend—as illustrated—over the two end faces 8 and 9 of the laminated core 5. The laminated rotor core 2 also has an electrical winding 10 which comprises several winding wires (not illustrated). The winding wires of the electrical winding 10 run through the slots 6, and a winding head 11 and, respectively, 12 is formed at each of the end faces 8 and 9 of the laminated core 5.

A collector 13 of a commutator 14 of the rotor 1 is also shown. The collector 13 is likewise arranged on the shaft 3 in a rotationally fixed manner. The collector 13 has several laminations 15 and also commutator hooks 16, wherein in each case one commutator hook 16 is associated with one lamination 15.

Figure 2:
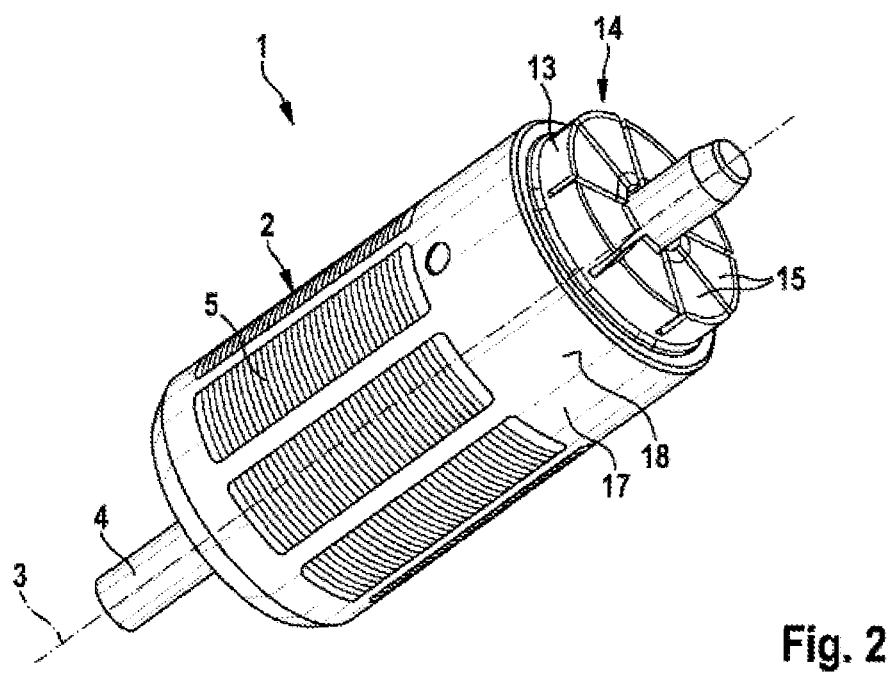
FIG. 2 is a perspective illustration of the rotor with a plastic encapsulation.

FIG. 2 shows the rotor 1 from FIG. 1, wherein the rotor 1, in particular the laminated rotor core 2, is encased by a plastic encapsulation 17 in regions. The electrical winding 10, in particular the winding wires, is/are entirely covered by the plastic encapsulation 17. In this respect, the slots 6 are closed by the plastic encapsulation 17. The outside of the laminated core 5 of the laminated rotor core 2 and the plastic encapsulation 17 adjoin one another in a flush manner, with the result that the laminated rotor core 2 with the plastic encapsulation 17 has a circular-cylindrical casing outer surface 18 overall. The plastic encapsulation 17 is also designed in such a way that it completely covers the winding head 11 which is remote from the collector 13. In addition, the plastic encapsulation 17 also completely covers the winding head 12, which faces the collector 13, and also the commutator hooks 16 of the collector 13.

Figure 3:
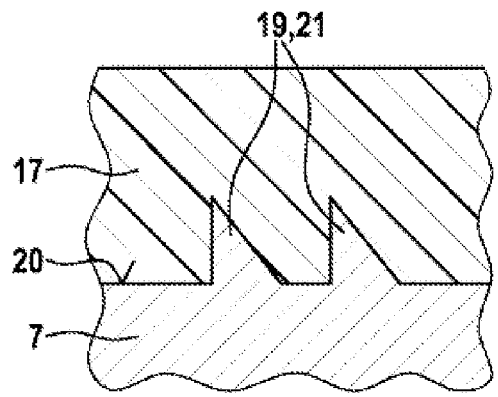
FIG. 3 shows a cross-sectional view of the ribs of a slot insulation.

FIG. 3 shows two raised portions 19 in the surface 20 of the slot insulation 7 of one of the slots 6 in cross section. The raised portions 19 are each in the form of a rib 21. The ribs 21 are of sawtooth-like design. Furthermore, said ribs are designed such that they are spaced apart in relation to one another and, in particular, are arranged in parallel with one another. One to five, in particular one to three, ribs 21 of this kind are preferably provided in the slot insulation 7 of each slot 6. The height of the ribs 21 is preferably from 0.1 mm to 0.9 mm, in particular from 0.25 mm to 0.75 mm. The width of the ribs 21 is preferably in the range of between 0.1 mm and 1.15 mm, in particular 0.25 mm and 1 mm. The ribs 21 can be in the form of longitudinal ribs or transverse ribs. A longitudinal rib is to be understood to mean a rib 21 which extends parallel to the rotation axis 3, that is to say in the direction of the slot extent. Several longitudinal ribs of this kind are preferably provided in the opening region, in particular at the slot edge 22, of the respective slot 6. In particular, the ribs 21 extend along the entire axial length of the slots 6. A transverse rib is to be understood to mean a rib 21 which extends transversely to the rotation axis 3.

The following procedure is performed in order to produce the rotor 1:

The laminated core 5 is initially mounted on the shaft 4. Before this or after this, the slot insulations 7 are injection-molded into the slots 6 and the end faces 8 and 9 of the laminated core 5 also provided with the slot insulations 7. The collector 13 of the commutator 14 is then fitted onto the shaft 4. In the next step, the winding wires of the electrical winding 10 are wound onto the laminated core 5 and, in the process, inserted into the slots 6. The entire component, that is to say, in particular, the laminated rotor core 2 and the collector 13, is then preheated. In this case, the plastic of the slot insulations 7 is consequently also heated. The rotor 1, in particular the laminated rotor core 2, is then encapsulated with the plastic of the plastic encapsulation 17. The plastic of the slot insulations 7 begins to melt close to the surface in the process, with the result that a cohesive connection is created between the plastic of the slot insulations 7 and the plastic of the plastic encapsulation 17. This is possible since the temperature of the plastic of the plastic encapsulation 17 during the encapsulation process is selected to be at least as high as the melting temperature of the plastic of the slot insulations 7. In particular, the melting temperature of the plastic of the plastic encapsulation 17 is equal to, similar to or higher than the melting temperature of the plastic of the slot insulations 7.

Figure 4:
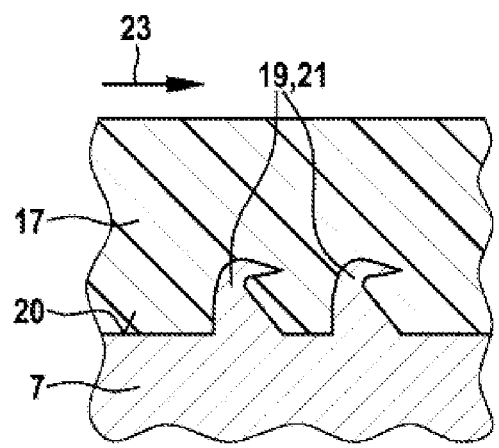
FIG. 4 shows a cross-sectional view of ribs during an encapsulation process.

During the encapsulation process with the plastic of the plastic encapsulation 17, the ribs 21 which are provided in the surface 20 of the respective slot insulation 7 can furthermore be deformed. This is shown in FIG. 4. The ribs 21 are deformed, in particular bent over, by the pressure of the plastic during the encapsulation process in the direction (arrow 23) in which the plastic of the plastic encapsulation 17 is molded on. This is possible, in particular, on account of the sawtooth-like design of the ribs 21 since the width and therefore the stability of the ribs 21 decreases with the height of said ribs. Therefore, not only a cohesive connection between the plastic of the slot insulations 7 and the plastic of the plastic encapsulation 17, but also an interlocking connection between said plastic of the slot insulations and said plastic of the plastic encapsulation are realized, wherein engagement from the rear is produced in each case by the ribs 21 being bent over.

Overall, a good and robust connection between the slot insulations 7 and the plastic encapsulation 17 is created in such a way that ingress of aggressive liquids, in particular aggressive constituent parts of liquids which can cause corrosion of the winding wires of the electrical winding 10, is reliably prevented.

What is claimed is:

1. A method for producing an electrical machine, the method comprising:
    providing a laminated core, wherein the laminated core has a first end face (8), a second end face (9), slots (6), and winding wires of at least one electrical winding (10), wherein the winding wires run in the slots (6);
    injection molding slot insulations (7) into the slots (6), the first end face (8), and the second end face (9);
    after the injection molding step, cooling the slot insulations (7) such that the slot insulations (7) at least partially solidify;
    after the cooling step, encapsulating the laminated core and the slot insulations (7) by molding a plastic encapsulation (17) on the laminated core and the slot insulations (7); and
    during and/or after the encapsulating step, cohesively connecting the slot insulations (7) and the plastic encapsulation (17) by virtue of incipient melting of the slot insulations (7) due to heat and/or pressure from the molding of the plastic encapsulation (17),
    wherein the plastic encapsulation (17) and the slot insulations (7) are each composed of a thermoplastic and the plastic of the slot insulations (7) has a melting point which is equal to or similar to or lower than that of the plastic of the plastic encapsulation (17).

2. The method as claimed in claim 1, characterized in that the slot insulations (7) and the plastic encapsulation (17) are composed of the same plastic.

3. The method as claimed in claim 1, characterized in that the encapsulation step is done in such a way that the plastic encapsulation (17) has a circular-cylindrical casing outer surface (18).

4. The method as claimed in claim 1, wherein the laminated core is a laminated stator core or laminated rotor core (2) of an electric fuel pump of a motor vehicle.

5. The method as claimed in claim 1, characterized in that the slot insulations (7) and the plastic encapsulation (17) are composed at least substantially of polyoxymethylene.

6. The method as claimed in claim 1, further comprising:
   after the cooling step and before the encapsulating step, heating the laminated core and the slot insulations (7).

7. A method for producing an electrical machine, the method comprising:
   providing a laminated core, wherein the laminated core has a first end face (8), a second end face (9), slots (6), and winding wires of at least one electrical winding (10), wherein the winding wires run in the slots (6);
   injection molding slot insulations (7) into the slots (6), the first end face (8), and the second end face (9), wherein a surface (20) of a respective slot insulation (7) of the slot insulations (7) has at least one of a raised portion (19) and a recessed portion;
   after the injection molding step, cooling the slot insulations (7) such that the slot insulations (7) at least partially solidify;
   after the cooling step, encapsulating the laminated core and the slot insulations (7) by molding a plastic encapsulation (17) on the laminated core and the slot insulations (7);
   during the encapsulating step, surrounding the raised portion (19) of the slot insulations (7) with the plastic encapsulation (17) when the at least one of a raised portion (19) and a recessed portion is a raised portion (19) or entering the recessed portion of the slot insulations (7) with the plastic encapsulation (17) when the at least one of a raised portion (19) and a recessed portion is a recessed portion; and
   during and/or after the encapsulating step, cohesively connecting the slot insulations (7) and the plastic encapsulation (17) by virtue of incipient melting of the slot insulations (7) due to heat and/or pressure from the molding of the plastic encapsulation (17),
   wherein the plastic encapsulation (17) and the slot insulations (7) are each composed of a thermoplastic and the plastic of the slot insulations (7) has a melting point which is equal to or similar to or lower than that of the plastic of the plastic encapsulation (17).

8. The method as claimed in claim 7, wherein the slot insulations (7) and the plastic encapsulation (17) are composed of the same plastic.

9. The method as claimed in claim 7, wherein the at least one of a raised portion (19) and a recessed portion is a recessed portion.

10. The method as claimed in claim 7, wherein the at least one of a raised portion (19) and a recessed portion is a raised portion (19).

11. The method as claimed in claim 10, wherein the raised portion (19) is in the form of a longitudinal rib or transverse rib (21).

12. The method as claimed in claim 11, wherein the ribs (21) are formed during the injection molding step such that the rib (21) is integrally formed with the respective slot insulation (7).

13. The method as claimed in claim 12, further comprising:
    during the surrounding of the raised portion (19) step and during the encapsulating step, deforming the rib (21).

14. The method as claimed in claim 7, wherein the encapsulation step is formed done in such a way that the plastic encapsulation (17) has a circular-cylindrical casing outer surface (18).

15. The method as claimed in claim 7, further comprising:
    after the cooling step and before the encapsulating step, heating the laminated core and the slot insulations (7).

16. The method as claimed in claim 7, wherein the laminated core is a laminated stator core or laminated rotor core (2) of an electric fuel pump of a motor vehicle.

17. The method as claimed in claim 7, wherein the slot insulations (7) and the plastic encapsulation (17) are composed at least substantially of polyoxymethylene.

* * * * *